Dec. 27, 1966 H. ULANET 3,294,940
STRUCTURALLY INTERLOCKED CAPSULE THERMOSTATS
Filed June 5, 1964
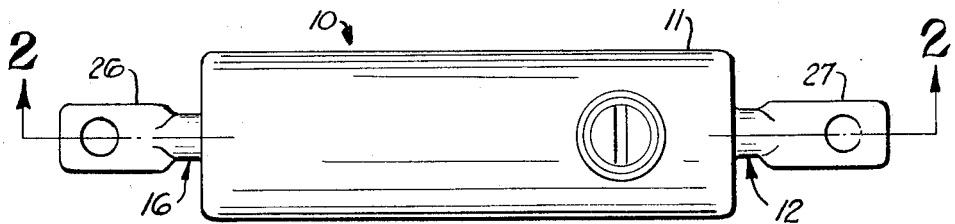
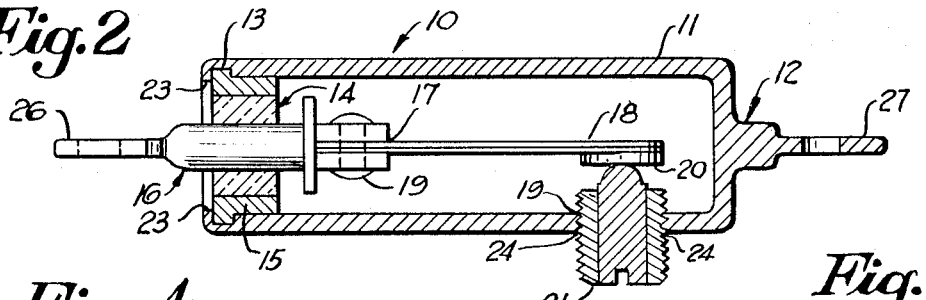
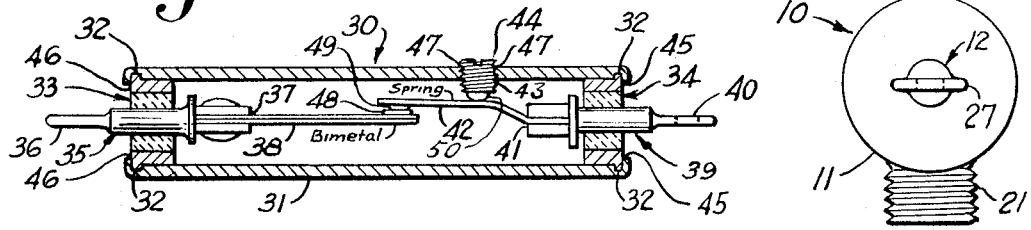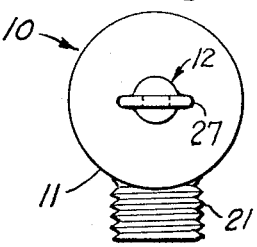
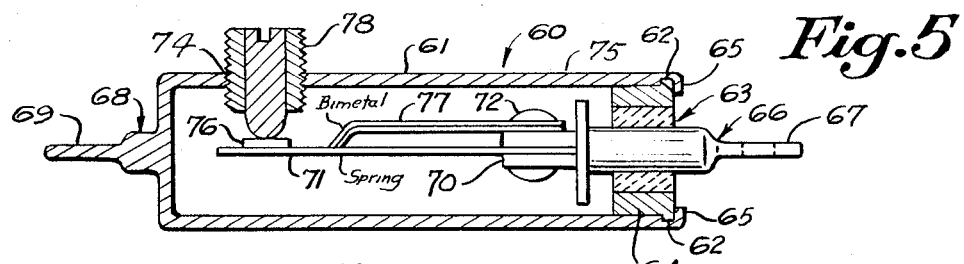
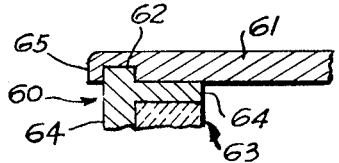
INVENTOR.
HERMAN ULANET
BY
Milo H. Hutchinson
ATTORNEY

United States Patent Office 3,294,940
Patented Dec. 27, 1966

3,294,940
STRUCTURALLY INTERLOCKED CAPSULE
THERMOSTATS
Herman Ulanet, 473 Richmond Ave.,
Maplewood, N.J. 07040
Filed June 5, 1964, Ser. No. 372,821
4 Claims. (Cl. 200—138)

This invention relates to capsule thermostats.

It is an object of the instant invention to provide a means for preventing shift from the original temperature calibration when the thermostat is subjected to excessive temperatures above and below the original calibration.

Another object is to prevent the contact points of a thermostat from turning out of proper alignment during the soldering operations for hermetically sealing as well as when connecting to the power supply.

It is also an object of the instant invention to create a thermostat in which the contact points assume precise contact alignment in both the vertical and horizontal planes.

Other objects of the instant invention will become apparent in the course of the following detailed description.

In the attainment of the aforesaid objectives subject thermostat is made in three embodiments.

The invention will appear more clearly from the following details when taken in conjunction with the accompanying drawings showing by way of example the preferred embodiments of the inventive concept.

In the drawings:

FIGURES 1, 2, and 3 show the first embodiment of the thermostat constructed in accordance with the principles of this invention and in which:

FIGURE 1 is a bottom view of the thermostat, looking up;

FIGURE 2 is a longitudinal view of the thermostat shown in FIGURE 1 in part section; and FIGURE 3 is a right end view of the thermostat shown in FIGURES 1 and 2;

FIGURE 4 shows the second embodiment of the thermostat in which:

FIGURE 4 is a longitudinal view in part section;

FIGURES 5 and 6 show the third embodiment in which:

FIGURE 5 is a longitudinal view in part section; and

FIGURE 6 is a fragmentary longitudinal view of the right end of FIGURE 5, enlarged, and showing the method of fixing a header in the open end of the thermostat without the use of solder.

Referring now to the first embodiment of the thermostat shown in FIGURES 1, 2, and 3, reference numeral 10 indicates the thermostat.

The thermostat 10 is constituted in part of a hollow body 11 of electrically conductive material and open at one end, at the left in FIGURE 2. At the opposite or closed end of the body 11 is an outwardly directed and integrally formed terminal 12 terminating in a flattened surface portion 27 as later described.

The open end of the body 11 is counter-bored or circumferentially recessed as at 13 (FIG. 2) or 62 (FIG. 6). In the counter-bored open end is inserted a known electrically non-conductible header 14 such as a glass seal with rim 15 suitable for soldering thereto. The body of the header at the inner end is of reduced diameter to fit snugly into the open end of the body 11 while the outer end is of greater diameter to fit snugly into the counter-bored portion 13 as illustrated in FIGURE 2 and also shown in FIGURE 6. The outer extension of the counter-bored open end which protrudes outwardly beyond the header when inserted is turned inwardly over the outer surface of the rim 15 of the header 14 whereby the header is firmly held in the body without the use of solder.

It has been found the eutectic solder when changing from a molten to a solid state develops forces which tend to turn the header out of its original orientation and results in improper contact alignment. To obviate such serious uncertainty during manufacture, applicant conceived the means of solidly anchoring the header into the counter-bored open end of a tubular body by crimping the protruding end of the counter-bored portion over the outside surface of the rim of the header. Thus, applicant employs solder only for sealing purposes when desired rather than as a mechanical fastening means.

Through the header 14 is another terminal 16. The outwardly directed end extremities of both terminals 12 and 16 as shown by numerals 27 and 26, respectively, are flattened and substantially in the same plane. The header, the rim thereof, and the terminal have approximately the same coefficient of expansion.

The inner end of the terminal 16 is slotted as shown by the numeral 17 (FIG. 2). The planes of the upper and lower surfaces of the slot 17 are coplanar with the flattened end extremities 27 and 26 of the terminals 12 and 16.

In the slot 17 is inserted one end of a bimetallic element 18 (FIG. 2). Through aligned openings (not shown) in the slotted end of the terminal 16 and the inserted end of the element 18 is a rivet 19 securely holding one end of the element in position. It will be noted that by this construction both sides of the bimetallic element are heated simultaneously for faster action. It will also be noted that the element terminates in a contact point 20. It will be further noted that if a spring member with contact point be used in conjunction with a bimetallic element, the problem will be slightly different as later shown.

It has been observed from tests that when the free end of a bimetallic element exerts a force against a stationary contact, a corresponding force is exerted against the head of a rivet where use is made of the known method of directly riveting one end of the element to the inwardly directed end of the terminal. In use, the force against the head of the rivet loosens the firmness of the element and throws it out of its original calibrated temperature value.

Substantially aligned with the contact point 20 of the bimetallic element 18 and through one wall of the body 11 is a threaded opening 19 the axis of which is substantially perpendicular to the plane of the flat surface portions 26 and 27 of the terminals and, of course, to the coplanar surfaces of the slotted inner end. Through the threaded opening 19 is an adjustable stationary contact point 21.

The turned over rim of the counter-bored open end of the body 11 may be hermetically sealed to the rim of the header by solder 23. In addition and after calibration, the stationary contact point 21 may be sealed by solder 24 to the hollow body 11.

By making the axis of the threaded opening 19 in the body 11 substantially perpendicular to the flattened end extremities 26 and 27 of the terminals 16 and 12 respectively and to the coplanar planes of the slotted inner end of the terminal 16 proper contact adjustment is assured in both the vertical and horizontal planes.

Referring now to the second embodiment of the thermostat shown in FIGURE 4, reference numeral 30 indicates the thermostat.

The thermostat 30 differs from the previously described and illustrated thermostat of the first embodiment chiefly in that the hollow body 31 of the second embodiment is open at both ends, and in the use of a bimetallic element and a spring member both of which have contact points in operable engagement at a predetermined temperature.

Each open end of the hollow body 31 is counter-bored or circumferentially recessed as at 32. In each counter-bored open end is a similar electrically non-conductible header or glass seal 33, at the left in FIGURE 4, and 34, at the right. Both headers have similar metal soldering rims as in the first embodiment and are designed on the inner end to fit snugly against the inner surface of the body while being of greater diameter on the outer end to fit snugly into the counter-bored portions 32. The outwardly directed portion of the rim of the body at each recessed end, after the insertion of the header, is crimped over a portion of the outer surface of the rim of the header inserted therein as most clearly shown in FIGURE 6.

Through the header 33 is a terminal 35 which extends outwardly and inwardly therefrom as illustrated in FIGURE 4. The outwardly extended end extremity 36 of the terminal 35 is made flat as illustrated. The inwardly directed end of the terminal 35 is slotted as at 37 with the planes of the upper and lower surfaces of the slot coplanar with the flattened surface portion 36. Within the slotted inner end of the terminal 35 is fixed by known means one end of a bimetallic element 38 which extends inwardly therefrom and terminates in a contact point 48 as shown.

Through the other header 34 is a second terminal 39 the inwardly directed end of which is slotted as at 41. The planes of the upper and lower surface portions of the slot 41 are substantially in the corresponding planes of the first mentioned slot 37. The outwardly directed end of the terminal 39 is flattened at the end extremely 40 and substantially in the plane of the flattened surface portion 36 of the first mentioned terminal 35.

In the slotted inner end of the terminal 39 is fixed by any known means one end of a spring member 42 which bends upwardly and thence inwardly and downwardly for operable engagement with the contact point 48 of the bimetallic element 38 through the contact point 49 of the spring member at a preselected temperature.

A threaded opening 43 is made through one wall of the body 31, the opening being aligned with the inwardly directed portion of the spring member 42 and with the axis of the opening in a plane substantially perpendicular to the plane of the flat surface portions 36 and 40 of the terminals and to the coplanar surfaces of the slotted inner ends. Through the threaded opening 43 is an adjustment screw 44 having an insulated tip 50 in operable engagement with the spring member whereby the pressure of the contact points of the bimetallic element and the spring member is varied.

Reference numerals 45 and 46 show the means of hermetically sealing the turned over rims of the body 31 around a portion of the rims of the inserted headers. Numeral 47 indicates the sealing means for adjustment screw. In both cases, the sealing means may be solder but the thermostat 30 is a strong structure of long life without the use of solder in any place.

Referring now to the third embodiment of the thermostat shown in FIGURES 5 and 6, reference numeral 60 shows the thermostat.

The third embodiment differs from the first in that both a spring member and a bimetallic element are used rather than the bimetallic element alone as in the first embodiment; in that the contact point for operable engagement with the stationary contact is carried by the spring member rather than by the bimetallic element; and further in the omission of solder in the third embodiment as compared with the solder sealed thermostat of the first embodiment.

The third embodiment differs from the second in that the hollow body of the third embodiment is open only at one end while the hollow body of the second embodiment is open at both ends; in that the bimetallic element of the third embodiment is in operable engagement with the spring member intermediate the ends thereof; and in that the bimetallic element of the third embodiment is not fixed in a slot as in the second embodiment but rather fixed to the inwardly directed end of one terminal in which one end of the spring member is fixed in the slot. In addition, no solder is used in the third embodiment although it could be used where a hermetically sealed thermostat is desired.

The thermostat 60 is constituted in part of a hollow body 61 open at one end, at the right in FIGURE 5, which is counterbored at 62.

In the counter-bored open end is an electrically non-conductible header 63 which has the soldering rim 64 for hermetically sealing to the body, if desired, after the outwardly protruding rim 65 of the counter-bored portion is crimped over a portion of the outer surface of the rim 64. As in the other embodiments, the inner end of the rim 64 is designed for a snug fit into the hollow body with the outer portion of the rim of greater diameter for a tight fit in the counter-bored open end as most clearly shown in FIGURE 6.

Through the insulator 63 is a terminal 66 which protrudes inwardly and outwardly therefrom. As in the other embodiments, the outer end extremity of the terminal 66 terminates in a flat surface portion 67.

Another terminal 68 of the thermostat, at the left in FIGURE 5, is integrally formed with the body 61 and at the outwardly directed end extremity has a flat surface portion 69 which is substantially in the plane of the flat surface portion 67 of the terminal 66.

The inner end of the terminal 66 is slotted as at 70. One end of a spring member 71 is fixed in the slot by any suitable means. From the fixed end, the spring member 71 is extended inwardly and has at the free end thereof a contact point 76 for operable engagement with a stationary contact member 75 which is described in the following paragraph.

A threaded opening 74 is made through one wall of the body 75, the opening being substantially aligned with the contact point 76 adjacent the free end of the spring member 71 and with the axis of the threaded opening in a plane substantially perpendicular to the plane of the flat surface portions 67 and 69 of the terminals and with the coplanar planes of the slot 70. Through the threaded opening 74 is a stationary contact point 73 in operable engagement with the contact point 76 of the spring member 71 at a predetermined temperature or temperature range.

One end of a bimetallic element 77 is secured also to the slotted end of the terminal 66 but in spaced relationship with the fixed end of the spring member 71 in the slot 70 and is held thereto by any suitable means 72 used also for holding the fixed end of the spring member 71 in the slot 70. The bimetallic element 77 extends inwardly in spaced arrangement with the spring member 71 and then turns downwardly for operable engagement therewith intermediate the free and fixed ends thereof.

I claim:

1. A structurally interlocked capsule thermostat comprising an electrically conductible hollow body with two counter-bored open ends, an electrically non-conductible header disposed in each counter-bored open end with a portion of the rim of the counter-bored open end turned over the periphery of the inserted header and a portion of the outside surface thereof adjacent thereto, an electric terminal disposed through each header substantially at the center and extended outwardly and inwardly therefrom, the outwardly extended end of each terminal terminating in a flattened surface portion substantially in the same plane, the inwardly directed end of each terminal being slotted with the upper and lower surfaces of each slot being coplanar with the flattened surface portions, one end of a bimetallic element fixed in the slot of one terminal and extended toward the opposite end of the body substantially along the longitudinal center line thereof, one end of a spring member fixed in the slot of the other terminal and extended inwardly therefrom toward the free end of the bimetallic element for operable engagement therewith, an adjustment screw with insulated tip disposed through the wall of the body for operable engagement with the spring member and in a plane perpendicular substantially to the coplanar surfaces, and means hermetically sealing the headers and adjustment screw in the body after calibration.

2. A structurally interlocked capsule thermostat comprising an electrically conductive hollow body with at least one counter-bored open end, a header disposed in the open end, said header comprising a core of insulating material surrounded by a metal bushing, said bushing being provided with a raised shoulder portion, a portion of the rim of the counter-bored open end turned over the periphery of the shoulder and a portion of the outside surface portion adjacent thereto, an electric terminal disposed through the header substantially at the center and extended outwardly and inwardly therefrom substantially along the longitudinal center line of the body, the outwardly extended end terminating in a flattened surface portion and the inwardly extended end being slotted with the upper and lower surfaces of the slot coplanar with the plane of the flattened surface portion, one end of a bimetallic element fixed to the slotted end of the terminal and extended toward the opposite end of the body, and means through a wall of the body in a plane substantially perpendicular to the flattened surface portion whereby the circuit through the body is opened and closed at predetermined temperatures.

3. A structurally interlocked capsule thermostat comprising an electrically conductive hollow body with one counter-bored open end, a header disposed in the open end, said header comprising a core of insulating material surrounded by a metal bushing, said bushing being provided with a raised shoulder portion, a portion of the rim of the counter-bored open end turned over the periphery of the shoulder and a portion of the outside surface portion adjacent thereto; an electric terminal disposed through the header substantially at the center and extended outwardly and inwardly therefrom substantially along the longitudinal center line of the body, the outwardly extended end of the terminal terminating in a flattened surface portion and the inwardly directed end being slotted with the upper and lower surfaces of the slot being coplanar with the plane of the flattened surface portion; one end of a bimetallic element fixed in the slotted end of the terminal and extended toward the opposite end of the body in spaced arrangement with the inner surface of the wall of the body; means through the wall in a plane substantially perpendicular to the flattened surface portion whereby the circuit through the body is opened and closed at predetermined temperatures; and another terminal formed integral with the body at the closed end thereof and terminating in a flattened surface portion substantially in the plane of the first mentioned flattened surface portion.

4. A structurally interlocked capsule thermostat comprising a hollow body having one counter-bored open end, a header disposed in the open end, the header comprising a core of insulating material surrounded by a metal bushing, said bushing being surrounded by a raised shoulder portion, a portion of the rim of the counter-bored open end turned over the periphery of the shoulder and a portion of the outside surface portion adjacent thereto; an electric terminal disposed through the header substantially along the longitudinal center line of the body, the outwardly extended end terminating in a flattened surface portion and the inwardly directed end being slotted with the upper and lower surfaces of the slot being coplanar with the plane of the flattened surface portion; one end of a spring member fixed in the slotted end of the terminal and extended toward the opposite end of the body in spaced arrangement with the inner surface of the wall of the body, one end of a bimetallic element fixed to the slotted terminal and extended inwardly therefrom for operable engagement with the spring member intermediate the ends thereof and in spaced arrangement with the inner surface of the wall of the body; means through the wall in a plane substantially perpendicular to the flattened surface whereby the circuit through the body is opened and closed at predetermined temperatures, and a second terminal formed integral with the body at the closed end and terminating in a flattened surface substantially in the plane of the first mentioned flattened surface portion.

References Cited by the Examiner
UNITED STATES PATENTS

| 2,416,067 | 2/1947 | Robb et al. | 174—50.56 X |
| 2,747,054 | 2/1956 | Valverde | 200—138 |
| 2,773,962 | 12/1956 | Perst | 200—138 |
| 2,826,630 | 3/1958 | Klebanoff et al. | 174—50.63 X |
| 2,906,840 | 9/1959 | Ulanet | 200—138 |
| 3,087,033 | 4/1963 | Dales | 200—138 |
| 3,100,827 | 8/1963 | Grimshaw | 200—113 |

OTHER REFERENCES

Lindner, German application No. 1,141,701, published Dec. 27, 1962.

BERNARD A. GILHEANY, *Primary Examiner.*

T. D. MACBLAIN, L. A. WRIGHT,
*Assistant Examiners.*